United States Patent
Beaty (10) Patent No.: US 9,807,194 B1
(45) Date of Patent: Oct. 31, 2017

(54) METHOD OF AUTOMATICALLY COMMUNICATING INFORMATION TO A PROFILE

(71) Applicant: Robert M Beaty, Flower Mound, TX (US)

(72) Inventor: Robert M Beaty, Flower Mound, TX (US)

(73) Assignee: RedCritter Corp., Flower Mound, TX (US)

( * ) Notice: Subject to any disclaimer, the term of this patent is extended or adjusted under 35 U.S.C. 154(b) by 0 days.

(21) Appl. No.: 14/204,514

(22) Filed: Mar. 11, 2014

Related U.S. Application Data (60) Provisional application No. 61/777,033, filed on Mar. 12, 2013.

(51) Int. Cl.
 *G06F 15/16* (2006.01)
 *H04L 29/08* (2006.01)

(52) U.S. Cl.
 CPC .................................. *H04L 67/306* (2013.01)

(58) Field of Classification Search
 CPC .... H04L 9/0872; H04L 63/0492; H04L 67/18
 See application file for complete search history.

(56) References Cited

U.S. PATENT DOCUMENTS

| | | | | |
|---|---|---|---|---|
| 9,715,833 B2* | 7/2017 | Jabara | ................. | G09B 5/00 |
| 2003/0200142 A1* | 10/2003 | Hicks | ................... | G06Q 30/02 |
| | | | | 705/14.27 |
| 2006/0115801 A1* | 6/2006 | Ganley | ................... | G09B 7/02 |
| | | | | 434/219 |
| 2006/0184484 A1* | 8/2006 | Al-Otaibi | .............. | G06Q 10/06 |
| | | | | 706/45 |
| 2010/0063867 A1* | 3/2010 | Proctor, Jr. | ........ | G06Q 30/0623 |
| | | | | 455/414.1 |
| 2011/0039249 A1* | 2/2011 | Packard | ................. | G09B 5/00 |
| | | | | 434/362 |
| 2011/0178863 A1* | 7/2011 | Daigle | .............. | G06Q 30/0231 |
| | | | | 705/14.31 |
| 2011/0306029 A1* | 12/2011 | Prince | .................... | G09B 7/02 |
| | | | | 434/350 |
| 2011/0314036 A1* | 12/2011 | Cunningham | ......... | G06Q 30/02 |
| | | | | 707/756 |
| 2012/0254312 A1* | 10/2012 | Patel | ..................... | G06Q 50/01 |
| | | | | 709/204 |
| 2013/0041952 A1* | 2/2013 | Silas | ...................... | G06Q 10/10 |
| | | | | 709/204 |
| 2013/0065584 A1* | 3/2013 | Lyon | .................... | H04W 28/06 |
| | | | | 455/434 |

(Continued)

*Primary Examiner* — Anthony Mejia
(74) *Attorney, Agent, or Firm* — Brian Tucker; Kirton McConkie (57) ABSTRACT

We disclose a software system, method and product for updating a subject's profile. The software system, method and product may include a computer processing means and computer readable medium, and a proximity device. The system may be triggered by an internal and/or external event such as a subject's handheld device receiving a payload from a proximity device. The system may update the subject's skill profile as defined by activity configurations. The system may also generate a visual indicator for display on a subject profile to demonstrate a skill, achievement, or other information associated with the Activity.

20 Claims, 5 Drawing Sheets

(56) References Cited

U.S. PATENT DOCUMENTS

| | | | |
|---|---|---|---|
| 2013/0117043 A1* | 5/2013 | Condon | G06Q 10/1057 705/2 |
| 2014/0012680 A1* | 1/2014 | Puckett | G06Q 30/0255 705/14.66 |
| 2014/0051506 A1* | 2/2014 | Ameling | G06Q 99/00 463/29 |
| 2014/0162220 A1* | 6/2014 | Rao | G09B 19/18 434/107 |
| 2014/0188442 A1* | 7/2014 | Zelenka | G06Q 50/20 703/2 |

* cited by examiner

METHOD OF AUTOMATICALLY COMMUNICATING INFORMATION TO A PROFILE

RELATED APPLICATIONS

The present patent document claims the benefit of the filing date under 35 U.S.C. §119(e) of Provisional U.S. Patent Application Ser. No. 61/777,033, filed Mar. 12, 2013, which is hereby incorporated by reference in its entirety.

BACKGROUND

The internet has grown as a communication device. Individuals increasingly rely on internet websites such as LINKEDIN.COM and FACEBOOK.COM to create profiles communicating information about their interests, skills, and achievements. For example, LINKEDIN.COM permits users to create professional profiles and create online resumes. Online profiles usually include information about work history, publications, education, association membership, and may also include information an individual's interests. Online profile information is communicated in text format.

Other online profile sites such as TWITTER, FOURSQUARE, and FACEBOOK may provide a space for an individual to communicate real time reports of the individual's location and activities (e.g., "just checked in at STARBUCKS", or "Attending TEDx.")

Current systems such as those listed above and similar systems are based exclusively on self-reporting. For example, in order to build a profile, the user logs into the account and begins manually inputting information such as work history, skills, and achievements in the form of text.

BRIEF SUMMARY

A system and method for automatically communicating to a profile information about a person's skills, activities, and achievements. The method involves using a proximity device to automatically communicate information about user skills, activities, and achievements, for example, in a peer-to-peer environment. The system further provides a manner to communicate the information in a non-textual symbolic form, e.g., through an icon such as a badge, certificate, or image representation.

A user sets action parameters using a software application. The software application stores the parameters and assigns the parameters a unique identification (ID). The software application generates a URL relating to the unique ID. A proximity device writer writes the returned URL onto a proximity device. A second user may acquire the information from the proximity device, which information will interact with an application on the user's device leading to an automatic updating of the second user's profile if parameters are met, and potentially an update of other related profiles.

Other systems, methods, features, and advantages of the disclosure will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The following description of the drawings and the various system, method, and apparatus is not intended to limit the inventive system, methods and apparatus disclosed herein to one embodiment, but rather to enable any person skilled in the art of project management and/or software development to make and use the inventive system, method and apparatus.

DETAILED DESCRIPTION OF THE DRAWINGS

Individuals and organizations increasingly rely upon electronic profiles, which can be accessed and searched, on the world wide web. For example, profile resources such as LINKEDIN and FACEBOOK have become almost ubiquitous for professionals engaging in commerce. They have also become one of the predominant methods of communicating information among peers, coworkers, potential clients, potential employers, and otherwise. A drawback of the currently existing profile systems is that they must be manually updated and maintained. An individual or organization using profile services must self-populate the information contained therein. For example, each individual must enter information about their education, their job history, their skills, publications and speeches, their interests, and etc. The information is entered in a textual form. They must also frequently update the profiles to reflect their continued activities, achievements, and movements. Entire businesses have sprung up to assist with this function, e.g., organizations and individuals hire staff to track their activities and manually entering text and update the text of their web profiles.

The applicant herein discloses one variation of a system for automatically generating skill, achievement, and other information. The disclosed system may be more efficient and more accurate than traditional self-reporting systems. In one variation, a platform for creating and maintaining a user profile is provided. The platform is accessible by the world wide web. The platform provides users (which may be individuals or organizations) with a personal profile for aggregating skills, achievements, biographical data, and historical data, including skills from multiple spheres of their personal and professional existence. The platform allows the display of information in a non-textual symbolic format. The symbolic format may permit others to make a quick assessment of the user's skills, activities, and/or interests.

Unlike known profile platforms, the disclosed profile platform (referred to herein for convenience as the "Tracker") allows third parties, including third party applications, to update the user's profile in real time. A simplified example follows:

Bill Jones works for Company. Company uses Tracker to manage project teams, set project management deadlines, and determine progress on projects. Bill's project manager, via Tracker, invites Bill into a project team and assigns tasks to Bill. When Bill is invited into the project, if Bill does not already have a profile with Tracker, Tracker creates a profile for Bill, e.g., associated with the email address he uses within the company. As Bill works within the Tracker system, (or within a peripheral system in communication with Tracker) the Tracker automatically updates Bill's profile to display the various skills Bill is using, Bill's progress, and Bill's achievements. The Tracker may report Bill's activities, skills, and achievements by applying icons to Bill's profile. In one example, the Tracker may apply badges to Bill's profile to demonstrate Bill's skills, the Tracker may apply certificates to Bill's profile to represent Bill's participation in continuing education events. For example, when Bill completes a task that requires Ruby programming, the Tracker may add a "Ruby" badge to Bill's profile. If Bill routinely works late on projects, the Tracker may communicate that Bill takes ownership of assigned projects by adding a "Dedication" badge to Bill's profile.

Outside of his work for Company, Bill may perform volunteer work for an organization ("Organization"). Like Company, Organization may use Tracker to manage its missions and projects. Organization, e.g., via Tracker, may invite Bill into a project, such as a charity home building project. Organization may find Bill's profile on Tracker, or Tracker will create a profile for Bill if one does not exist. Organization may assign Bill tasks within the project. As the tasks are completed, the Tracker may communicate real time skills Bill is using by adding icons to Bill's Tracker profile.

The Tracker will recognize if Bill already has a profile within the Tracker system, and aggregate the skills from both the Organization and the Company into one profile. In this case, the Organization may add an icon, such as a badge for the skill of "carpentry." Organization may add certificates representing Bill's participation in training exercises such as "Organizational Development" or "Building Communication Skills."

Outside of both of these communities, Bill may be a member of a health and wellness club ("Club"). Club may use Tracker to assist members in setting goals and analyzing their progress toward those goals. Club may also use Tracker collected information to make marketing and business decisions. Tracker may automatically update Bill's profile to communicate that Bill has attained a particular golf handicap, has achieved a level of proficiency with swimming, or has achieved a black belt in a martial art. Tracker aggregates the information from the Company, the Organization, and the Club into one profile that Bill can use to communicate his skills and achievements. The information is automatically entered as Bill performs the activities of his life.

The information is aggregated into one location so that Bill can carry the profile with him when he changes employers, clubs, or organizations. The profile view may be tailorable by both Bill and the third parties who are delivering the information to Bill's profile. For example, Bill may elect to hide his health club information from his employer. Bill's employer may elect to hide Bill's sales record from individuals outside of the organization, and similar. This can be further extended to flushing out Bill's education, certifications, and otherwise. For example, educational institutions using Tracker may track Bill's progress through the education process and automatically communicate Bill's educational achievements to the Tracker for display on Bill's profile. This may lead to more accurate information because it is real time and it does not rely solely on self-entry (e.g., manual inputs) by Bill, but on actual activities.

The system, providing a centralized profile, interacting with multiple sources of information distinguishes it from what is known. Typically, software developers go into a company or organization and create a separate database for that company. All of the information about the users (e.g., subjects, administrators, etc.) are stored within that organization's infrastructure. The individual users may not have a way of transporting the information when they leave or publically communicating the information outside of the organization.

The above summary and use of "Tracker" to designate a centralized system is provided to introduce a simplified environment in which the disclosure operates. The summary is not intended to identify key features or essential features of the claimed subject matter.

This disclosure focuses on how skill, achievement, interests and other information may be communicated to a subject's profile when the subject is "out in the real world," e.g., not logged into a project management software and not in front of a computer.

The method disclosed herein is a method of using proximity devices such as but not limited to NFC tags and QR codes to communicate a subject's activities, which (e.g., if they meet stated parameters and conditions) can be translated into icons on a subject's profile.

We disclose a software system, method, and product that, among other things, perform at least one of using proximity devices to communicate a subject's activities. The software system, method and product may be aggregate and display the collected information on a unified user profile. The system, method, and product may further provide the ability for organizations to have wider information about subjects and/or for users to have more complete information about organizations on which to base decisions, including but not limited to, human resource decisions, training decisions, hiring decisions, team building decisions, consumer decisions. The software system, method and product, may have the advantage of overcoming self-reporting biases by generating the information automatically when the tasks and skills are actually demonstrated by the subject. Furthermore, it may overcome the underreporting errors that arise out of individuals failing to regularly update their profiles when new skills are acquired, new achievements are earned, and similar.

Definitions

Definitions: unless stated to the contrary, for the purpose of the present disclosure the following terms shall have the following definitions:

A reference to "another variation" in describing an example does not imply that the referenced variation is mutually exclusive with another variation unless expressly specified.

The terms "a," "an" and "the" mean "one or more," unless expressly specified otherwise.

The phrase "at least one of" when modifying a plurality of things (such as an enumerate list of things) means any combination of one or more of those things, unless expressly specified otherwise.

The term "represent" and like terms are not exclusive, unless expressly specified otherwise. For example, the term "represents" does not mean "represents only," unless expressly specified. In other words, the phrase "the data represents X," describes both "the data represents X" and "the data represents X and the data also represents something else."

The term "based upon" or "based on" or other similar variants does not mean "based only on" and rather expresses "based at least on."

The term "e.g." and like terms means "for example, but not limited to" and thus does not limit the term or phrase it explains.

The term "determining" and grammatical variants thereof (e.g., determining whether a subject performed an action) is used in a broad sense. The term "determining" encompasses a wide variety of actions and therefore "determining" can include calculating, computing, processing, deriving, investigating, looking up (for example, looking up in a table, a database, or another data structure), ascertaining, and the like. Also, "determining" can include receiving (e.g., receiving information), accessing (e.g., accessing data in a memory) and the like. Determining may also include resolving, selecting, choosing, establishing and etc.

The term "herein" means "in this patent application including anything which may be incorporated by reference," unless otherwise specified.

The various processes described herein may be implemented by, e.g., a programmed general purpose computer and/or computing device. For example, a processor, (e.g., one or more microprocessors, one or more microcontrollers, on or more digital signal processors, and/or otherwise) may receive instructions (e.g., from a memory or similar device), and execute those instructions, thereby performing one or more processes in the instructions.

A processor may mean, for example but not limited to, one or more microprocessors, central processing units (CPUs), computing devices, microcontrollers, digital signal processors, or like devices, and/or any combination thereof. The apparatus or device that implements a process or method described herein, may include, for example, any input devices and/or output devices appropriate to perform the process and/or method. Further, programs that implement processes and/or methods (as well as other types of data) may be stored and transmitted using a variety of media (e.g., computer readable media) and in a variety of ways. Additionally or alternatively, variation combinations of hardware and/or software may be used instead of software only. For example, hard-wired circuitry or custom hardware may be used in place of, or in combination with, some or all of the software instructions that, for example, have the ability to implement the processes of variations described herein.

We refer for simplicity to "storage device" (e.g., FIG. 2, 250) as a short hand for computer-readable medium. Computer-readable medium (and thus storage device 250) may refer to any medium that participates in providing data (e.g., instructions, data structures) which may be read by a computer, a processor, or other similar device. Such a medium may take many forms, including but not limited to, non-volatile media, volatile media, and transmission media. Non-volatile media may include, for example but not limited to, optical or magnetic disks and/or other persistent memory. Volatile media may include dynamic random access memory (DRAM). Computer readable media may also include, for example, non-transitory computer-readable medium, floppy disks, flexible disks, hard disks, magnetic tape, any other magnetic media, CD-ROM, DVD, any other optical medium, and any other memory chip or cartridge, or any other medium from which a computer can read.

Various forms of computer readable media may be involved in carrying data (e.g., sequences of instructions) to a processor. For example, data may be delivered from RAM to a processor, carried over a wireless transmission medium, formatted and/or transmitted according to one or more formats, standards, and/or protocols, such as but not limited to Ethernet, SAP, ATP, BLUETOOTH, TCP/IP, TOMA, CDMA, and/or 3G; and/or encrypted to ensure privacy or prevent fraud in any known way.

Various steps in a process do not indicate that all of the described steps are required or that the steps are required to be performed in the order described. Just as the description of various steps in a process does not indicate that all of the steps are required, all of the steps do not necessarily have to be performed on the same computer/computing device.

Where databases are described, it will be understood that alternative database structures to those described may be readily employed and that other memory structures other than databases may be readily employed. Any illustrations or descriptions of any sample databases represented herein are illustrative arrangements. Any number of other arrangements may be employed. Similarly, any illustrated entries of the databases represent exemplary information only—the number and content of entries may be different from those described herein. Further, the database may have any format including relational databases, object-based models, and/or distributed databases. In addition, databases may be stored locally or remotely from any device(s) which access data in the database.

The system, method and software product may be configured to work in various network environments, including but not limited to a computer that is in communication (e.g., via a communications network) with one or more devices. The computer may communicate with the devices directly or indirectly, via any wired or wireless medium. Each of the devices may themselves comprise computers or other computing devices that may or may not be adapted to communicate with the computer. Any number and type of devices may be in communication with the computer.

Interface may be any suitable type of network interface and/or local interface (e.g., an interface for programming and information retrieval), such as but not limited to any of the following: a keyboard, mouse and monitor; a mobile phone or smart phone; a tablet; a laptop; or otherwise.

DESCRIPTION

Figure 1:
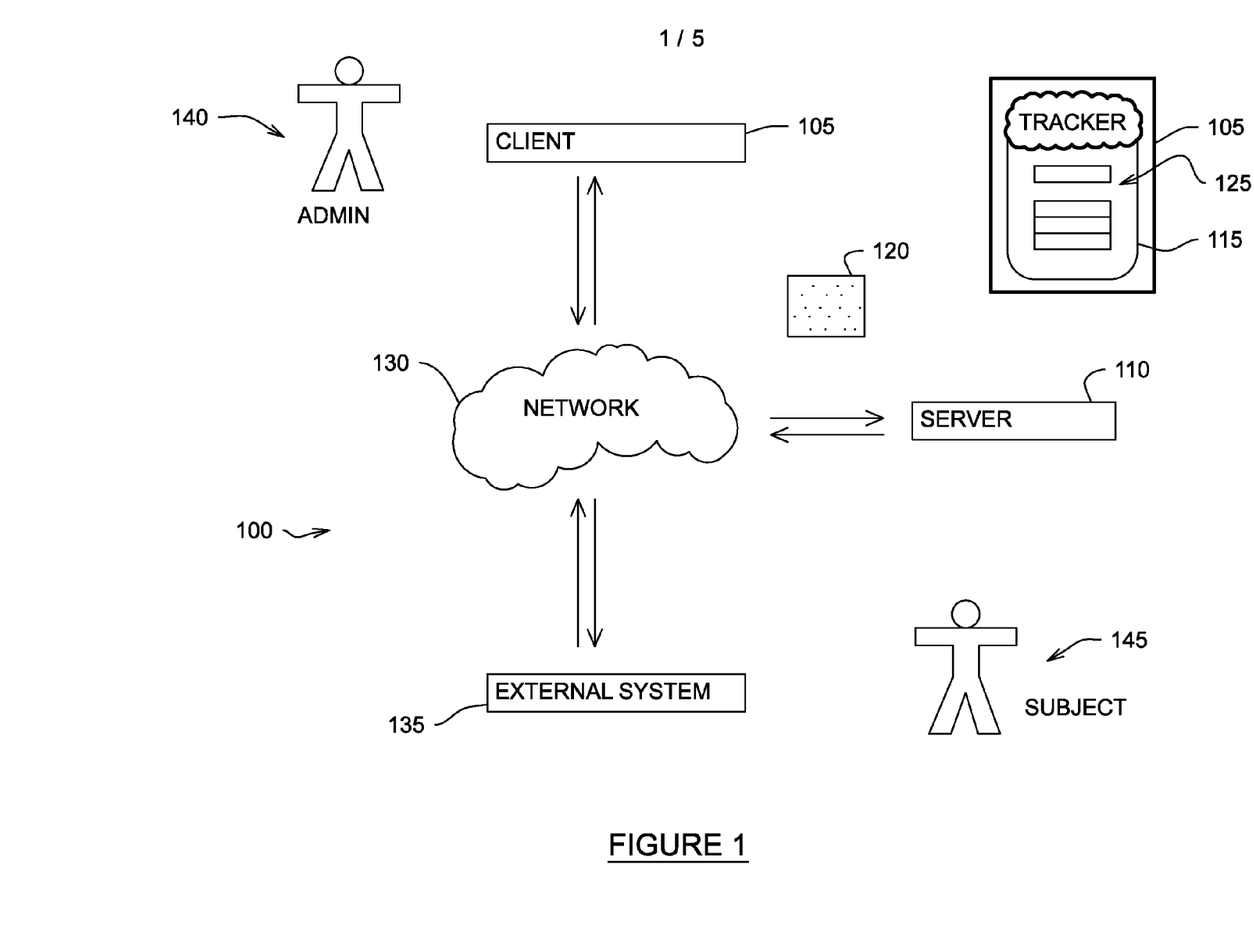
FIG. 1 is a diagram of an exemplary environment in which systems and methods described herein may be implemented.

FIG. 1 is a diagram of an exemplary environment 100 in which systems and methods described herein may be implemented. Environment 100 may include one or more clients 105 connected to one or more servers 110 via a network 130. One client 105 and one server (e.g., server 110) is shown for simplicity. In practice, there may be more or fewer clients 105 and servers 110. Also, in some instances, a client 105 may perform a function of a server 110 and a server 110 may perform a function of a client 105. The exemplary environment 100 may also include users. Users may include organizations, companies, educational institutions, individuals, or other entities benefiting from performance tracking and/or capable of performance reporting.

Clients 105 may be a device, such as a personal computer, a wireless telephone, a personal digital assistant, a tablet computing device, a smart phone, a lap top, or another type of computation or communication device, a thread or process running on one of these devices, and/or an object executed by one of these devices. In one implementation, a client 105 may include a user interface (e.g., via a browser 115) that permits access to the functionality of the disclosed software system, method and product. (For example, a user interface that presents through a browser 115, e.g., a user profile, a dashboard for creating and conditioning awards for loading onto proximity devices, applications for removing, creating, accepting, editing awards.) Client 105 may also include software such as a plug-in, an applet, and application, or other executable object or process, that may operate in conjunction with (or be integrated into) the user interface to obtain and display skills tracking information. Client 105 may obtain the software from the server 110 or from a third party, such as a third party server, disk, tape, network, CD-ROM, etc. Alternatively, the software may be pre-installed on client 105.

The exemplary environment 100 may also include users. In this example, the users are identified as administrators 140 and subjects 145. Subjects 145 may broadly describe any type of individual capable of performing actions, e.g., an employee, an employment candidate, a team member, a team candidate, a student, a test subject, a participant. An administrator 140 broadly describes any type of individual capable of creating and entering a skill profile into the skill tracking system.

The exemplary environment 100 also includes a proximity device 120. The proximity device 120 may be, for example but not limited to, a near field communication device ("NFC"), a Quick Response ("QR") tag, or similar. The client 105 may be enabled with a proximity device 120, for example but not limited to, enabled to read a proximity device 120, to program a proximity device 120 or otherwise interact with (send and receive information from and to) a proximity device 120.

Figure 2:
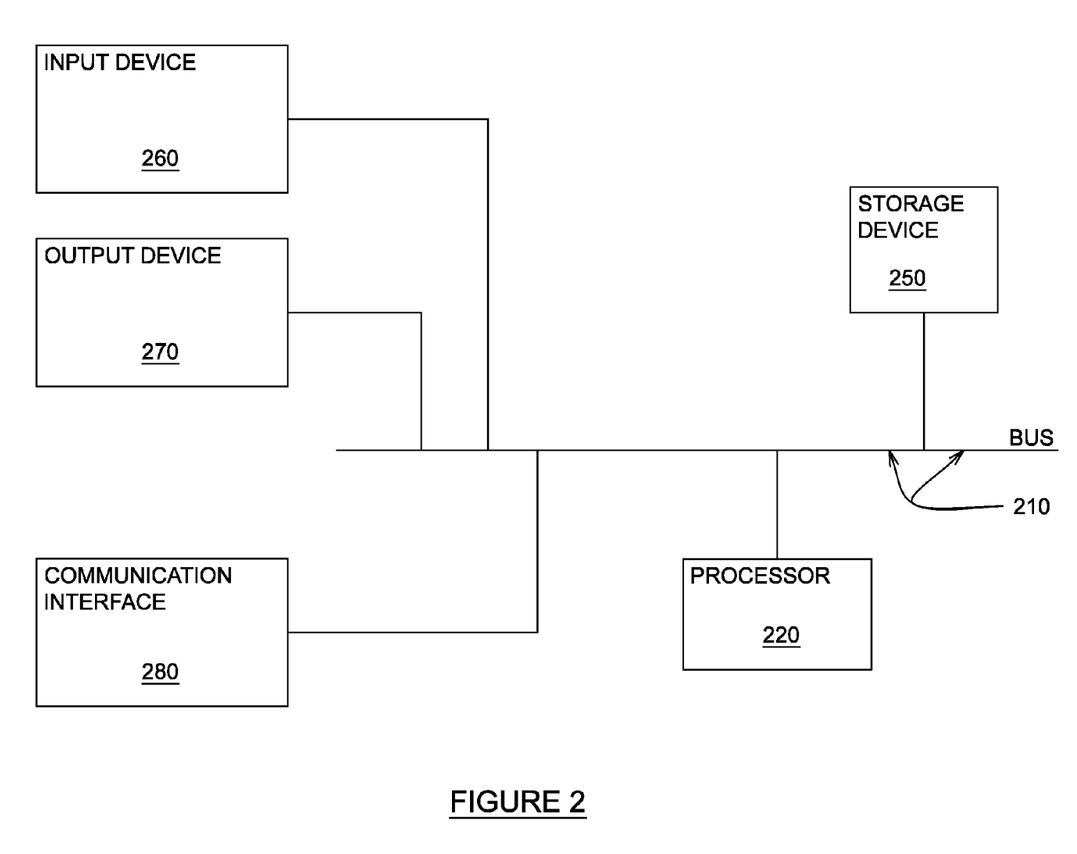
FIG. 2 is a diagram of exemplary components of a client or a server of FIG. 1.

Storage device(s) FIG. 2, 250 may store or maintain the data, instructions, or databases that may be used in or developed by the disclosed software system, method and product. While server 110 and storage device 250 are shown as separate entities, it may be possible for one or more of server 110 and storage device 250 to perform one or more of the functions of another one or more of server 110 and storage device 250. For example, it may be possible for server 110 and storage device 250 to be implemented as a single server. It may also be possible for a single one of server 110 and storage device 250 to be implemented as two or more separate (and possibly distributed) devices.

Network 130 may include any type of network, such as a local area network (LAN), a wide area network (WAN), a telephone network, a cellular network, an intranet, the Internet, cloud computing, or a combination of networks. Clients 105 and servers 110 may connect to network 130 via wired and/or wireless connections.

FIG. 2 is a diagram of exemplary components of a client 105 or server 110 entity, which may correspond to one or more of clients 105 and/or server 110. As shown in FIG. 2, the client/server entity may include, a processor 220, a storage device 250, an input device 260, an output device 270, and a communication interface 280. In another implementation, client/server entity may include additional, fewer, different, or differently arranged components than are illustrated in FIG. 2.

Bus 210 may include a path that permits communication among the components of the client/server entity. Processor 220 may include a processor, a microprocessor, or processing logic (e.g., an application specific integrated circuit (ASIC) or a field programmable gate array (FPGA)) that may interpret and execute instructions (for further explanation, see Definitions above). Input device 260 may include a mechanism that permits an operator to input information to the client/server entity, e.g., a keyboard, a mouse, a button, a pen, a touch screen, voice recognition and/or biometric mechanisms, etc. Output device 270 may include a mechanism that outputs information to the operator, including a display, a light emitting diode (LED), a speaker, etc. Communication interface 280 may include any transceiver-like mechanism that enables the client 105 and/or server 105 to communicate with other devices and/or systems. For example, communication interface 280 may include mechanisms for communicating with another device or system via a network, such as network 130.

As will be described in detail below, the client 105 and/or server 110 may perform certain operations relating to, for example but not limited to, receiving action descriptions and parameters, acquiring information about a user's activities, determining whether the user's activities meet the parameters, updating a user's profile with information about the user's skills, activities, achievements, and similar, alternatively or additionally, the client 105 and/or server 110 may generate and communicate to a profile real-time information about a user. In this example, the users are identified as administrators 140 and subjects 145. The client 105 and/or server 110 entity may perform these operations in response to processor 220 executing software instructions contained in a non transitory computer-readable medium, such as memory 250. A computer-readable medium may be a logical or physical memory device. A logical memory device may include a space within a single physical memory device or spread across multiple physical memory devices.

The software instructions may be read from another computer-readable medium, such as storage device 250, or from another device via communication interface 280. The software instructions contained in storage device 250 may cause processor 220 to perform processes that will be described later. Alternatively, hardwired circuitry may be used in place of or in combination with software instructions to implement processes described herein. Thus, implementations described herein are not limited to any specific combination of hardware circuitry and software.

Figure 3:
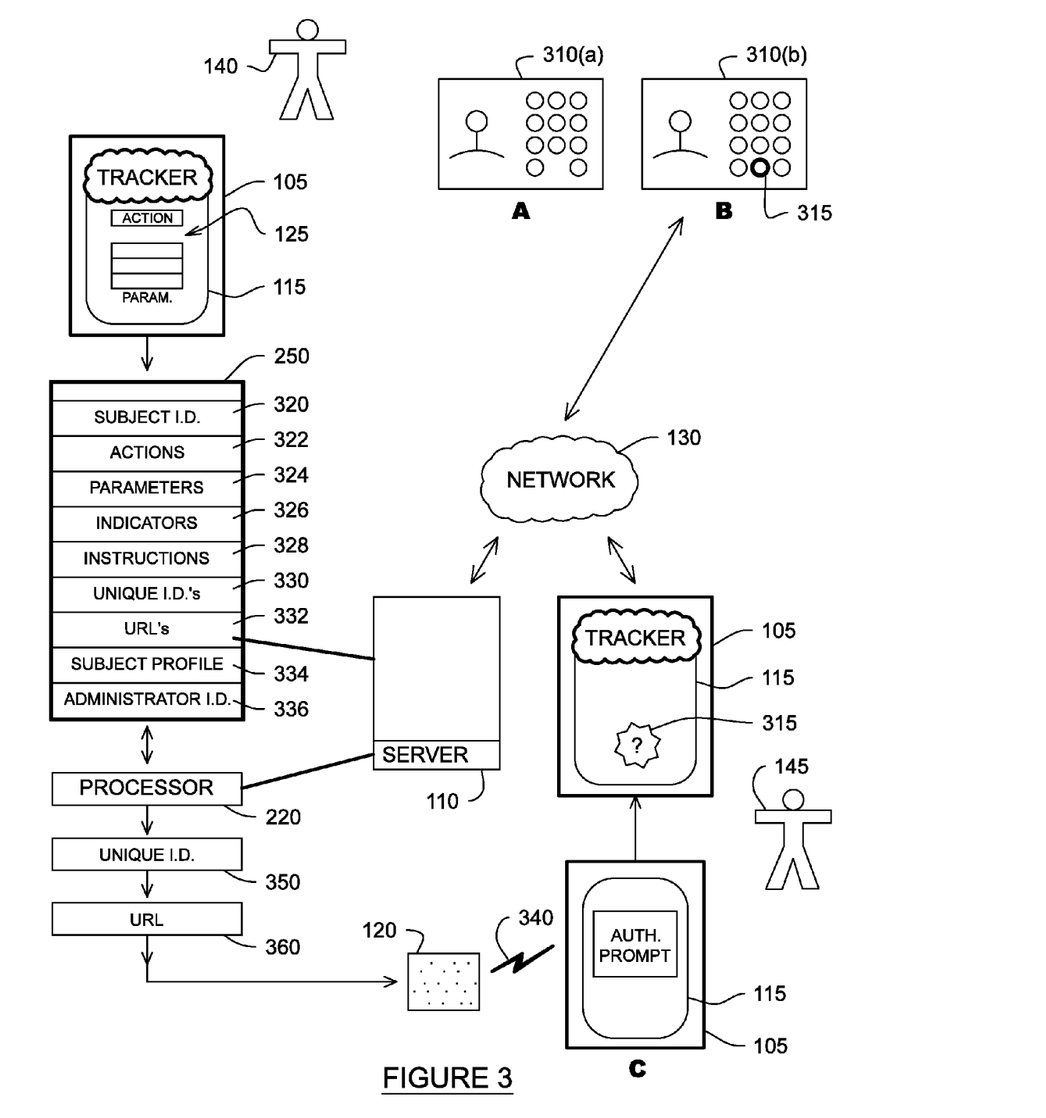
FIG. 3 is a diagram of functional components the system.

FIG. 3 is a diagram of exemplary functional components of exemplary environment 100. As shown in FIG. 3, storage device 250 may include at least one of subject ID component 320, action component 322, an action parameter component 324, indicator component 326, a instructions component 328, a unique identification component 330, a URL component 332, a subject profile component 334, an administrator identification component 336. As discussed above, the components are for illustration, may not be mutually exclusive, and may be combined or subdivided. For ease of discussion, we separate the categories in this illustration.

The subject ID component 320 may be one or a set of unique identifiers assigned to a subject 145. The subject ID component 320 may be used by the client 105, server 110, processor 220 and otherwise to locate the particular subject 145 with whom subject profile component 334 is associated.

The action component 322, may store actions when entered into the system by an administrator 140 and/or may be preloaded with a selection of actions. An action refers to an act that results from the triggering event (e.g., a client 105 accessing a proximity device 120) assuming that the criteria for the action are met. Exemplary actions include but are not limited to adding to or deleting from points in a subject's profile component 334; awarding, removing, or modifying icons (e.g., badges, certificates) on a subject's profile component 334.

An action parameter component 324, may store parameters associated with each action. For example, the type of action to be distributed (e.g., points, icons, badges, certificates), the quantity of items to be distributed, the expiration date, criteria that must be met (length of time in the meeting, arriving on time, completing prerequisites).

The indicator component 326, may store individual indicators. For example a particular indicator 315, which may be a visual graphic representing the result of an action (e.g., representing a skill, completion of a certification, completion of a challenge). The skill indicator component 326, may include information about indicators 315 such as an indicator or graphic associated with the action, alternative and/or additional indicators or graphics associated with achievement of a level of a skill, alternative and/or additional indicators or graphics associated with e.g., the highest level of achievement of the skill, the recency of the skill, the current level of the skill, or otherwise.

The instructions component 328, may store the logic for determining (e.g., using subject profile component 334, action parameters component 324 and other elements of the system) whether an action and/or action parameter is fulfilled. Among other things, it may also store instructions on how to program a proximity device 120, how to receive a proximity payload 340, how to assign unique ID's to a category of data, how to associate a unique URL to a unique ID.

A unique identification component 330, may be one or a set of unique identifiers assigned to an action, e.g., stored in action component 322. Additionally or alternatively, the unique identification component 330 may be associated with the parameter's associated with that action.

A URL component 332, may store information associating a unique ID to a unique URL.

A subject profile component 334, may store, among other information, the subject's 145 name, email addresses, and icons, points, certificates, or other items earned by the subject 145.

An administrator identification component 336, may store unique ID's for administrators 140 and associated data such as authentication data, actions created, actions awarded, or otherwise.

The Example that follows introduces one variation of the software system, method, and product. This summary is intended to be illustrative and not limiting.

FIG. 3 provides an example of how subject 145 information may be collected and reported to a subject profile 310. In general functioning, an administrator 140 would enter a system via an input device 260, which may be a client 105. A browser 115 on a client 105 presents the administrator 140 with a programming dashboard 125 that includes a field providing the option to, for example, create an action. Through the programming dashboard 125 displayed on the browser 115, the administrator 140 may associate the action with an indicator 315 for display on a subject profile 310 when the action is triggered. The administrator 140 may further assign parameters to the indicator 315, e.g., number of indicators 315 available for issue, expiration time, and etc. The administrator 140 entered data would be received by a server 110 and stored in a storage device 250. The data will be associated with a unique identification component 330 which unique identification component 330 will be associated with a URL component 332. The URL component 332 will be written to the proximity device 120.

When a client 105 held by a subject 145 interacts with the proximity device 120, the proximity device will deliver the proximity payload 340 to the subject's 145 client 105, which will trigger the client 105 to open the associated application (e.g., the application associated with the proximity payload 340) in the browser 115 (FIG. 3C).

The associated application, implementing instructions described in more detail below, will send the unique identification 250 associated with the URL 260 to the server 110 and request from the server 110 the information associated with the URL 260. The processor 220 running the instructions stored on the storage device 250 will determine whether an indicator 315 should be sent to the subject profile 310, and if so, it will make the necessary adjustments to the subject profile 310. This is illustrated by the subject profile 310*a* changing state to subject profile 310*b* if the action and/or action parameter is fulfilled.

The proximity device 120 may be used as a means for communicating information about a subject 145 in the real world by, e.g., using mobile devices. For example, a certificate is being awarded for attending a continuing education session. In this example, a charged proximity device 120 may be placed near the door of a conference room or classroom. As subjects 145 enter the classroom they may receive the proximity payload 340 from the proximity device 120 via a client 105 which may be a mobile device. The subject 145 may acquire a URL 260 from the proximity device 120. This transfer of the proximity payload 340 (including the URL 260 contained therein) to the client 105 may instruct a program running on the client 105 to communicate information to the server 110 associated with, e.g., a Tracker program (e.g., via a communication network 130). The information communicated to the server 110 may trigger the processor 220 executing instructions stored on the storage device 250 to process data related to the unique identification 250 associated with the URL 260 delivered in the proximity payload 340, to determine whether and how a subject's profile 310 should be updated, e.g., by award of a certificate for attending the continuing education session.

In another nonlimiting example of how the proximity device 120 may be used as a means of communicating information about a subject 145, a subject 145 may receive a badge or award directly from another client 105 machine held by another individual. For example, a manager may issue or remove an indicator 315, such as points, a badge or award, to a subject 145 by bumping proximity device 120 enabled devices. This bumping or otherwise bringing the devices into an appropriate proximity may be the trigger event that sets off the software system, method and product described herein.

Figure 4:
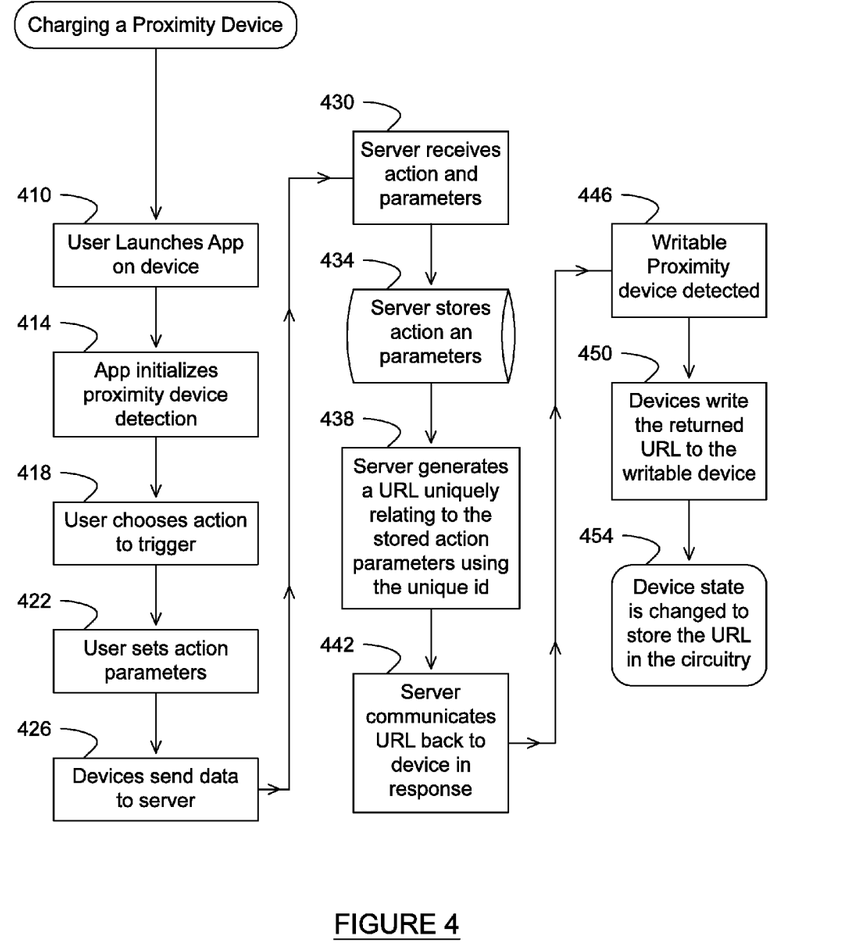
FIG. 4 is a flow chart of an exemplary process for programming a proximity device.

FIG. 4 is a flow chart of an exemplary process for programming a proximity device 120 to interact with the software system, method and product of updating a subject's profile 310 with skill, achievement, performance, and similar information.

In one implementation, the process of FIG. 4 may be performed by one or more components within client 105, server 110, or a combination of client 105 and server 110. In another implementation, the process may be performed by one or more components within another device or a group of devices separate from or including client 105 and/or server 110. Also, while FIG. 4 shows blocks in a particular order, the actual order may differ. For example, some blocks may be performed in parallel or in a different order than shown in FIG. 4.

In all variations, it should be understood that the description of the software system, method and product is likewise a description of a computer-readable medium (e.g., storage device 250) storing a program for performing the process. The storage device 250 can store (in any appropriate format) those program elements appropriate to perform the software system, method and product. Further, each process involves a processor 220 receiving instructions (e.g., from a storage device 250), and executing those instructions, thereby performing one or more processes.

In a first example of FIG. 4, the process of FIG. 4 may be carried out through a software application, for example, a web application or a mobile application. At [410] a user, which may be an administrator 140 launches an application via a client 105. At [414] the application detects a proximity device 120. At [418] the administrator 140 chooses an action. The action is the event that triggers the process retrieving data from the storage device and processing the data retrieved to generate a result of updating a subject profile 310 with information about the subject 145. The action created at step [418] is stored on the storage device 250, for example, in the action component 322.

At [422] the administrator 140 sets action parameters. The action parameters may include choosing an indicator, a total number of actions available, an expiration date, any prerequisites to earning the indicator, among others.

At [426] the actions and action parameters are sent to the storage device 250. At [430] the actions and action parameters are received by the storage device 250. At [434] the server stores the action and action parameters, for example, in the action component 322 and the action parameter component 324, among others.

At [438] the server generates a URL relating to the stored action and action parameters. The URL 260 may be generated directly or the server may first associate the action and action parameters with a unique ID 250 which is associated with the URL 260.

At [442] the server communicates the URL 260 to the client 105. For example, the application operating on the client 105 may request the URL 260.

At [446] a writable proximity device 120 is detected on or in association with the client 105. At [450] the URL 260 is written to the proximity device 120 (see, e.g., 574 in FIG. 5). At [454] the state of the proximity device 120 is changed to store the URL 260.

Figure 5:
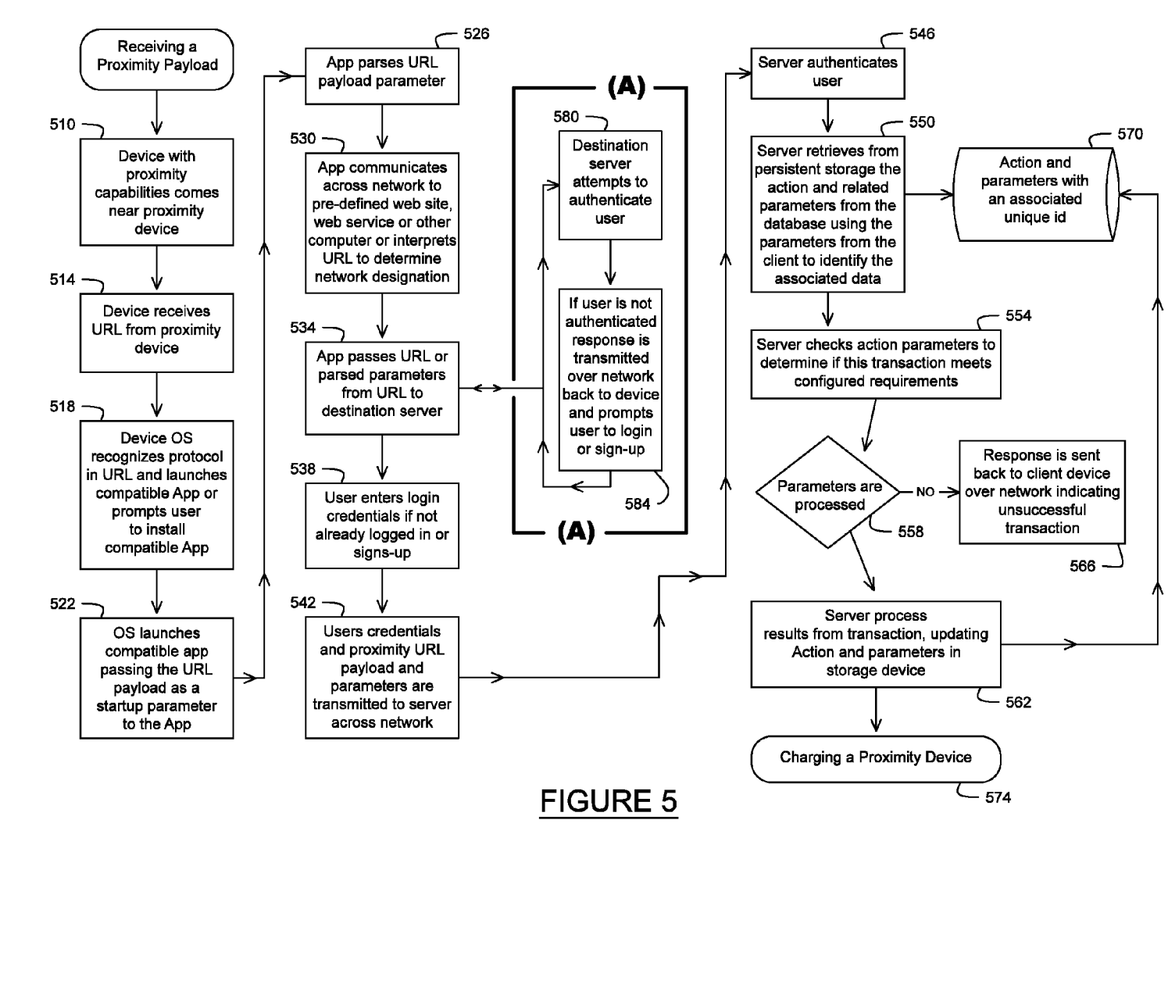
FIG. 5 is a flow chart of an exemplary process for receiving a proximity payload.

FIG. 5 is a flow chart of an exemplary process for receiving a proximity payload 340 from a proximity device 120. At [510] a client 105 with proximity device reading capabilities interacts with a proximity device 120. At [514] the client 105 receives the URL 260 from the proximity device 120. At [518] the operating system on the client 105 recognizes the protocol in the URL 260. The operating system on the client 105 to launch a compatible application. If the compatible application does not already exist, the operating system prompts the user to install the compatible application.

At [522] the operating system passes the URL 260 as the startup parameter for the compatible application. At [526] the compatible application parses the URL 260 parameters. At [530] the compatible application communicates to a location, which may be a destination server, designated by the URL 260. The URL 260 may designate a web site, a computer, or a network designation. At [534] the application passes the URL 260 and/or parsed parameters of the URL 260 to the destination server. At [538] the user enters login credentials, if not already logged in to the destination server. If the user does not have log in credentials, the user is prompted to sign up and create log in credentials.

At [542] the users credentials and the URL 260 obtained from the proximity device 120 and any parameters associated with the URL 260 are transmitted across a network to the destination server. At [546] the destination server authenticates the user (e.g., the subject 145). At [550] the destination server retrieves data from the storage device 250. The destination server queries the storage device 250 and retrieves data associated with the user credentials. In one example, the destination server queries the storage device 250 and retrieves data from the subject profile component 334 and/or the subject ID component 320. At 570, the destination server queries the storage device 250 and retrieves data associated with the URL 260. In one example, the destination server queries the storage device 250 and retrieves data from one or more of the action component 322 (e.g., the action associated with the URL 260), the action parameters component 324 (e.g., the parameters of the action), the indicator component 326 (e.g., the indicator to be assigned to the subject 145 if the parameters of the action are met), the instructions component 328 (e.g., the instructions for determining whether the action parameters are fulfilled, the instructions for transmitting an indicator to a subject profile 310), the URL component 332 and/or the unique identification component 330, among others.

At [554] the server checks the action parameters to determine if the transaction meets the configured requirements. For example, the server analyzes one or more of whether the expiration date has been met, whether the total number of available indicators have been assigned, whether the subject 145 has met the prerequisites, among others. At [558] the parameters are processed, the data retrieved from the storage device is processed and transformed into a result of updating a subject profile as designated by the action or not updating a subject profile.

At [562] the server processes the results of the transaction, updating the action and parameters in the storage device 250. For example, if the subject profile 310 is updated with an indicator, the server sends the information for storage in the subject profile component 334. In another example, the server updates the storage device 250 to reflect that an indicator has been awarded, for example, decreasing the number of remaining actions.

At [566], if the action parameters are not satisfied, the server will send the client 105 a response indicating the transaction is unsuccessful. The subject profile 310 will not be updated.

FIG. 5, A demonstrates the optional authentication steps. At [580] the destination server attempts to authorized the user. At [584] if the user is not authenticated, the server sends a response to the client 105 prompting the user to create log in credentials.

In another example, the process of FIG. 4 may be carried out through a software application, for example, a web application or a mobile application. The software application may be loaded on a client 105, for example, a client 105 enabled with a proximity device 120. A client 105 may be enabled to interact with a proximity device 120 either by design (e.g., have integrated capabilities) or by the addition of an external enabling device.

The user, which may be an administrator 140, launches an application on a client 105 [block 410]. A programming dashboard 125 appears on the browser 115. The programming dashboard 125 may provide an interface through which the user, e.g., administrator 140, directs programming of the proximity device 120. Upon a command from the user, e.g. administrator 140, or otherwise, the application detects the proximity device 120 [block 414]. The server 110 sends to a browser 115 of a client 105 programming dashboard 125. The user, e.g. administrator 140, via the programming dashboard 125 is presented with the option of creating an action [e.g., at block 418].

In this case, an action may be associated with an indicator 315 that will be transferred from one client 105 (e.g., an administrator's 140 client 105) to a second client 105 (e.g., a subject's 145 client 105) via the use of a proximity device 120, for display on a subject's profile 310 upon the occurrence of a set of events and/or the existence of a set of parameters. To illustrate, an indicator 315 may be an image, design, word, sound, graphic, or otherwise, e.g., an image of a trophy, thumbs-up, high five, star, dollar sign, tree or a combination of these representing information about an action performed or achieved by the subject 145.

The administrator 140 creates the action by entering information into the programming dashboard 125 displayed in the browser 115. The programming dashboard 125 may present the administrator 140 with preloaded actions and parameters, may recall stored actions and parameters the administrator 140 previously designed, or may permit the administrator 140 to create their own actions and parameters [block 418]. In one example, the administrator 140 may, by interacting with the programming dashboard 125 on the browser 115, create a new action for communication via a proximity device 120. The administrator 140 may, for example, create the action "Level III Completion Certificate."

The programming dashboard 125 may also present the administrator 140, with the ability to add parameters to the action [block 422]. Exemplary parameters include the type of indicator 315 to award (e.g., choose a specific icon such as a digital image file), the quantity of indicators 315 to award (e.g., the total number of awards available for subjects to earn), an expiration date, criteria that must be met for award (e.g., length of time in a class, number of classes attended, prerequisites (e.g., other events attended, other skills achieved, deficiencies filled).

The client 105 sends data representing the action and the associated parameters to a server 110 [block 426]. The server 110 receives the action and parameters [block 430] and sends the information for storing on a storage device 250 [block 434]. The data representing the action and the associated parameters are associated with a unique identification 350. The server 110 generates a URL 360 and assigns the URL 360 to the unique identification 350 [block 438]. The URL 360 is related (e.g., via its association with the unique identification component 350) to the stored action and associated parameters. In some variations, the URL component 360 may be the unique identification component 350.

The server 110 communicates the URL 360 to back to the client 105 [block 442]. The client 105 detects a writable proximity device 120 (e.g., a NFC or QR tag) [block 446]. The client 105 writes the returned URL 360 to the writable proximity device 120 [block 450]. The state of the proximity device 120 is changed to store the URL 360 in its circuitry (in the case of NFC) or bar code (in the case of QR) [block 454].

FIG. 5 is a flow chart of an exemplary process for receiving a proximity payload 340 from a proximity device 120. The proximity payload 340 includes the action and parameters associated with the URL 360 and/or any unique identification 350. The client 105 may process the received proximity payload 340 which may result in an update to the subject's profile 310 with skill, achievement, performance, and similar information (e.g., illustrated by transformation from 310a to 310b on FIG. 3). This use of proximity devices 120 is unique. The proximity device 120 in this case communicates detailed information between devices, the detailed information associated with a functional ability to generate a trigger to a software system or method. By contrast current uses of proximity devices are limited to communicating static information such as a phone number or a web address unassociated with a functional ability to generate a trigger to a software system or method. E.g., this software system, method and product is unique in that the proximity payload 340 carries a URL 360 which triggers an action within a software system causing further processing and resulting in the tangible result of a change in the state of a subject profile 310 (among other results).

In one implementation, the process of FIG. 5 may be performed by one or more components within client 105, server 110, or a combination of client 105 and server 110. In another implementation, the process may be performed by one or more components within another device or a group of devices separate from or including client 105 and/or server 110. Also, while FIG. 5 shows blocks in a particular order, the actual order may differ. For example, some blocks may be performed in parallel or in a different order than shown in FIG. 5.

In all variations, it should be understood that the description of the software system, method, and product is likewise a description of a non transitory computer-readable medium (e.g., storage device 250) storing a program (a set of instructions) for performing the process. The storage device 250 can store (in any appropriate format) those program elements appropriate to perform the method. Further, each process involves a processor 220 receiving instructions (e.g., from a storage device 250), and executing those instructions, thereby performing one or more processes.

Turning to FIG. 5, a client 105 with proximity device capabilities engages a proximity device 120 [block 510]. The client 105 may engage the proximity device 120 in some of the exemplary ways discussed above. Among others, the proximity device 120 may be placed near a door allowing subjects 145 entering or exiting a class room access the proximity device 120 to, e.g., record their attendance; the proximity device 120 may be placed on a work site (e.g., a construction work site) allowing subjects 145 to access the proximity device 120 to record the completion of a task (such as participation in a charity-build project); the proximity device 120 may be placed at the final station of a work-out circuit in a health club allowing subjects 145 to record completion of their work-out; the proximity device 120 may be placed on a graduation podium, allowing diploma indicators to be automatically updated onto a subject's profile 310. These are just a few examples of where a proximity device 120 might be placed for access by a subject 145.

The client 105 receives from the proximity device 120 a proximity payload 340 including a URL 360 [block 514] and its associated parameters. The operating system of the client 105 recognizes the URL 360, e.g., the protocol of the URL 360 and launches a compatible application for parsing the proximity payload 340 [block 518]. If the client 105 is not already programmed with the compatible software application, receipt of the proximity payload 340 may prompt the client 105 to install the compatible software application [block 518].

The proximity payload 340 may act as a startup parameter triggering the operating system of the client 105 to launch the compatible application and/or prompt the subject 145 to download and install the compatible application [block 522]. The application running on the client 105 parses the proximity payload 340 parameters [block 526]. The application communicates across a network 130 to a predefined website, web service, or other computer or interprets the URL 360 to determine the network 130 destination [block 530]. The application passes to the destination server 110 at least one of the URL 360 from the proximity payload 430 and/or the parsed parameters from proximity payload 340 [block 534].

An optional authentication step may take place (FIG. 5, callout A). The destination server 110 authenticates the subject 145 [block 580]. This authentication step [block 580] may involve the server 110 calling the storage device 250 to query the subject 145 account information, e.g., stored in a database on the server 110. If a subject 145 account is not located, the server 110 may transmit back over the network 130 to the client 105 a prompt for subject 145 to enter credentials and/or to sign up for a profile. The subject 145 may be associated with a subject identification recorded in the subject identification component 320 with which the subject's 145 information is associated for retrieval and display on a subject profile 310.

User (e.g. subject 145) credentials (e.g., subject I.D. for access of subject profile data from Subject Profile component 334) and proximity payload 340 (e.g., derived from querying the storage device 250) are transmitted to the server 110 across the network 130 [block 542]. The server 110 queries the storage device 250 and locates and retrieves the data associated with the subject profile 310 [block 546]. The server 110 queries the storage device and locates and retrieves from the storage device 250 the data associated with the proximity payload 340. For example, the server 110 passes the unique I.D. 350 (e.g., from the unique identification component 330) and/or the URL 360 (e.g., from the URL component 332) to the storage device 250 and calls up from the database on the storage device 250 associated data, e.g., actions, parameters, instructions, indicators and other data associated with the unique I.D. 350 and or URL 360. The server 110 also passes the subject 145 credentials to the storage device 250 to call up all information associated with the subject 145 (e.g., in the subject profile component 334).

The server 110, via a processor 220, checks the action parameters to determine whether the transaction meets the configured requirements for performing the action (e.g., updating the subject's profile 310 with information) [block 554]. In an example, the action "Level III Completion Certificate" may be associated with a prerequisite parameter. The prerequisite parameter may be as follows: the indicator associated with the action "Level III Completion Certificate" will be awarded if the subject 145 has already earned "Level II Completion Certificate." The server 110 via the processor 220 may analyze the data associated with the subject's profile 310 (e.g., stored in the subject profile data 334) to determine whether the appropriate prerequisites are met, e.g., whether the subject has earned "Level II Completion Certificate." In another example, the server 110 via the processor 220 may analyze existing transaction data (e.g., data updated and stored on the database and associated to the unique identification component 330) relating to e.g., whether the action has expired, whether the total number of actions available has been exhausted. If the parameters are not met, a response is sent to the client 105 device (e.g., for display on a browser 115) indicating unsuccessful transaction [block 566].

If the parameters are met, the server 110 processes the results of the transaction, updating the action and parameters in the storage device 250 [block 562]. If the parameters are met, a success response will be transmitted to the client 105. The success response may include and/or executed any associated action, such as the delivery of a visible indicator 315 to a subject profile 310.

In a variation, A method for delivering information about a subject to a subject profile comprising: receiving on a hand held device a payload provided from a proximity device; determining a destination server, an activity and an activity parameter from the received payload; activating a connection with the destination server; determining a subject profile associated with the hand held device; determining whether the activity is authorized to be delivered to the subject profile; and if the activity is authorized to be delivered to the subject profile, updating the subject profile to reflect the activity.

In a variation, A method for delivering information about a subject to a subject profile comprising: receiving on a hand held device a payload provided from a proximity device; determining a destination server, an activity and an activity parameter from the received payload; activating a connection with the destination server; determining a subject profile associated with the hand held device; determining whether the activity is authorized to be delivered to the subject profile; and if the activity is authorized to be delivered to the subject profile, updating the subject profile to reflect the activity. Further including, the activity includes awarding at least one item chosen from the group consisting of a badge, points, and a certificate.

In a variation, A method for delivering information about a subject to a subject profile comprising: receiving on a hand held device a payload provided from a proximity device; determining a destination server, an activity and an activity parameter from the received payload; activating a connection with the destination server; determining a subject profile associated with the hand held device; determining whether the activity is authorized to be delivered to the subject profile; and if the activity is authorized to be delivered to the subject profile, updating the subject profile to reflect the activity. Further including a unique identification as a URL.

A system for delivering information about a subject to a subject profile comprising: a communication interface configured to receive activity information from a proximity device; a processor; a non transitory computer readable media storing an application executable by the processor upon receipt of a payload from the proximity device, wherein, the application is configured to determine a destination server, an activity, and an activity parameter from the non transitory computer readable media based; and the application further configured to identify a subject profile, determine whether the activity is authorized, if the activity is authorized to be delivered to the subject profile, updating the subject profile to reflect the activity.

In a variation, A system for delivering information about a subject to a subject profile comprising: a communication interface configured to receive activity information from a proximity device; a processor; a non transitory computer readable media storing an application executable by the processor upon receipt of a payload from the proximity device, wherein, the application is configured to determine a destination server, an activity, and an activity parameter from the non transitory computer readable media based; and the application further configured to identify a subject profile, determine whether the activity is authorized, if the activity is authorized to be delivered to the subject profile, updating the subject profile to reflect the activity. The activity further including awarding at least one item chosen from the group consisting of a badge, points, and a certificate.

In a variation, A system for delivering information about a subject to a subject profile comprising: a communication interface configured to receive activity information from a proximity device; a processor; a non transitory computer readable media storing an application executable by the processor upon receipt of a payload from the proximity device, wherein, the application is configured to determine a destination server, an activity, and an activity parameter from the non transitory computer readable media based; and the application further configured to identify a subject profile, determine whether the activity is authorized, if the activity is authorized to be delivered to the subject profile, updating the subject profile to reflect the activity. Further including a payload comprising a URL.

In a variation, A method of providing information about a subject to a subject profile, comprising the steps of:

providing a computer processing means and a non transitory computer readable media; providing a proximity device configured to store a unique identification; providing a subject profile; inputting at least one identifier for a subject, and storing the at least one identifier for the subject on the non transitory computer readable media; inputting at least one activity, and storing the at least one activity on the non transitory computer readable media; inputting at least one activity parameter, and storing the at least one activity parameter on the computer readable media; associating the activity and activity parameter with the unique identification; writing the unique identification to the proximity device; upon a condition in which a client interacts with the proximity device; activating the server to receive the unique identification; upon a condition in which the server is activated; locating the activity and the activity parameters associated with the unique identification from the non transitory computer readable media; determining whether a parameter for fulfilling the activity is met; and upon a condition in which the parameter for fulfilling the activity is met; updating the subject profile to reflect the activity.

In a variation, A method of providing information about a subject to a subject profile, comprising the steps of: providing a computer processing means and a non transitory computer readable media; providing a proximity device configured to store a unique identification; providing a subject profile; inputting at least one identifier for a subject, and storing the at least one identifier for the subject on the non transitory computer readable media; inputting at least one activity, and storing the at least one activity on the non transitory computer readable media; inputting at least one activity parameter, and storing the at least one activity parameter on the computer readable media; associating the activity and activity parameter with the unique identification; writing the unique identification to the proximity device; upon a condition in which a client interacts with the proximity device; activating the server to receive the unique identification; upon a condition in which the server is activated; locating the activity and the activity parameters associated with the unique identification from the non transitory computer readable media; determining whether a parameter for fulfilling the activity is met; and upon a condition in which the parameter for fulfilling the activity is met; updating the subject profile to reflect the activity. Further including awarding at least one item chosen from the group consisting of a badge, points, and a certificate.

In a variation, A method of providing information about a subject to a subject profile, comprising the steps of: providing a computer processing means and a non transitory computer readable media; providing a proximity device configured to store a unique identification; providing a subject profile; inputting at least one identifier for a subject, and storing the at least one identifier for the subject on the non transitory computer readable media; inputting at least one activity, and storing the at least one activity on the non transitory computer readable media; inputting at least one activity parameter, and storing the at least one activity parameter on the computer readable media; associating the activity and activity parameter with the unique identification; writing the unique identification to the proximity device; upon a condition in which a client interacts with the proximity device; activating the server to receive the unique identification; upon a condition in which the server is activated; locating the activity and the activity parameters associated with the unique identification from the non transitory computer readable media; determining whether a parameter for fulfilling the activity is met; and upon a condition in which the parameter for fulfilling the activity is met; updating the subject profile to reflect the activity. Further including a payload comprising a URL.

In a variation, A computer software product comprising a non transitory medium readable by a processor, the medium having stored thereon a set of instructions for updating a subject profile, comprising: a first sequence of instructions which, when executed by a processor, causes the processor to associate a unique identification to an activity and an activity parameter; a second sequence of instructions which, when executed by a processor, causes the processor to store the unique identification on a proximity device as a payload; a fourth sequence of instructions which, upon a condition in which the payload is received by a handheld device, launches an application on the handheld device; a fifth sequence of instruction which, when executed by a processor, retrieves activity information and activity parameters associated with the unique identification from the non transitory computer readable media; a sixth sequence of instruction which, when executed by a processor, determines whether the activity is authorized; and a seventh sequence of instructions which, upon a condition in which the activity is authorized, updates a subject profile.

In a variation, A computer software product comprising a non transitory medium readable by a processor, the medium having stored thereon a set of instructions for updating a subject profile, comprising: a first sequence of instructions which, when executed by a processor, causes the processor to associate a unique identification to an activity and an activity parameter; a second sequence of instructions which, when executed by a processor, causes the processor to store the unique identification on a proximity device as a payload; a fourth sequence of instructions which, upon a condition in which the payload is received by a handheld device, launches an application on the handheld device; a fifth sequence of instruction which, when executed by a processor, retrieves activity information and activity parameters associated with the unique identification from the non transitory computer readable media; a sixth sequence of instruction which, when executed by a processor, determines whether the activity is authorized; and a seventh sequence of instructions which, upon a condition in which the activity is authorized, updates a subject profile. Further including the payload comprising a URL.

In a variation, A computer software product comprising a non transitory medium readable by a processor, the medium having stored thereon a set of instructions for updating a subject profile, comprising: a first sequence of instructions which, when executed by a processor, causes the processor to associate a unique identification to an activity and an activity parameter; a second sequence of instructions which, when executed by a processor, causes the processor to store the unique identification on a proximity device as a payload; a fourth sequence of instructions which, upon a condition in which the payload is received by a handheld device, launches an application on the handheld device; a fifth sequence of instruction which, when executed by a processor, retrieves activity information and activity parameters associated with the unique identification from the non transitory computer readable media; a sixth sequence of instruction which, when executed by a processor, determines whether the activity is authorized; and a seventh sequence of instructions which, upon a condition in which the activity is authorized, updates a subject profile. Further including the activity comprising at least one item selected from the group consisting of points, badges and certificates.

The invention is not limited to the embodiments illustrated and described, as it also covers all equivalent implementations insofar as they do not depart from the spirit of the invention. Further, the invention is not yet limited to the combination of features as described herein but may be defined by any other combination of all of the individual features disclosed. Further, the invention is not yet limited to the sequence of method steps as described herein but may be defined by any other combination or order the steps disclosed. Any person skilled in the art of will recognize from the previous detailed description and from the figures and claims that modifications could be made to the disclosed embodiments of the invention without departing from the scope of the invention.

The invention claimed is:

1. A method, performed by a server system, for automatically updating a user profile comprising:
    creating and storing, on the server system, an action data set representing an action that a user can perform and defining an indicator that can be awarded for performance of the action;
    creating and storing a unique identifier in association with the action data set, the unique identifier also being associated with a URL;
    writing the unique identifier and the associated URL to a proximity device;
    creating and storing, on the server system, a user profile for a first user, the user profile being associated with an identifier of the first user;
    in response to the first user employing a client device to interface with the proximity device to thereby receive the unique identifier from the proximity device, receiving, from the client device, a first communication that includes the unique identifier and the identifier of the first user;
    employing the unique identifier received from the client device to locate the action data set;
    extracting the indicator from the action data set;
    employing the identifier of the first user to locate the first user's user profile; and
    updating the first user's user profile to include the indicator from the action data set.

2. The method of claim 1, wherein the action data set also defines action parameters.

3. The method of claim 2, wherein the action parameters include criteria for determining whether the indicator is to be awarded to a user.

4. The method of claim 3, further comprising:
    evaluating the criteria prior to updating the first user's user profile to include the indicator.

5. The method of claim 4, wherein the criteria includes a time, and wherein evaluating the criteria includes determining that the first communication is received prior to the time.

6. The method of claim 4, wherein the criteria includes a required duration of time, and wherein evaluating the criteria includes determining that a previous communication was received that included the unique identifier and the identifier of the first user and that a duration of time between receiving the previous communication and the first communication exceeds the required duration of time.

7. The method of claim 4, wherein the criteria includes prerequisites, and wherein evaluating the criteria includes accessing content of the first user's user profile to determine whether the first user has met the prerequisites.

8. The method of claim 4, wherein the prerequisites require that a user profile include an indicator associated with a second action data set, and wherein determining whether the first user has met the prerequisites comprises determining that the first user's user profile includes the indicator associated with the second action data set.

9. The method of claim 4, wherein the prerequisites define one or more characteristics of a user, and wherein determining whether the first user has met the prerequisites comprises determining that the first user's user profile defines the one or more characteristics.

10. The method of claim 4, wherein the prerequisites define a number of communications that include the unique identifier and the identifier of the first user that must be received.

11. The method of claim 1, wherein the indicator comprises one or more of:
    points;
    an icon;
    a badge; or
    a certificate.

12. The method of claim 1, wherein the proximity device is a Near Field Communication device or a QR code.

13. The method of claim 1, wherein the proximity device is located at a location where the action can be performed.

14. The method of claim 13, wherein the action comprises attending a meeting or class.

15. The method of claim 1, further comprising:
    after updating the first user's user profile, sending, to the client device, the first user's user profile for display to the first user.

16. One or more non-transitory computer storage media storing computer executable instructions which when executed on a server system implement a method for automatically updating a user profile comprising:
    creating and storing, on the server system, a number of action data sets, each action data set representing an action that a user can perform and defining an indicator that can be awarded for performance of the action;
    creating and storing, for each action data set, a unique identifier in association with the action data set, the unique identifier also being associated with a URL;
    writing the unique identifier and the associated URL for a first action data set to a proximity device;
    creating and storing, on the server system, a user profile for a first user, the user profile being associated with an identifier of the first user;
    in response to the first user employing a client device to interface with the proximity device to thereby receive the unique identifier for the first action data set from the proximity device, receiving, from the client device, a first communication that includes the unique identifier for the first action data set and the identifier of the first user;
    employing the unique identifier for the first action data set received from the client device to locate the first action data set from among the number of action data sets;
    extracting the indicator from the first action data set;
    employing the identifier of the first user to locate the first user's user profile; and
    updating the first user's user profile to include the indicator from the first action data.

17. The computer storage media of claim 16, wherein the first action data set also defines criteria for determining whether the indicator is to be awarded to a user, the criteria including one or more of:
    a time before which the first communication must be received;
    a required duration of time between receiving the first communication and a previous communication that includes the unique identifier for the first action data set and the identifier of the first user; or one or more prerequisites that the first user must meet.

18. The computer storage media of claim 17, wherein the indicator comprises one or more of:
- points;
- an icon;
- a badge; or
- a certificate.

19. A system comprising:
- a server system that stores a plurality of action data sets, each action data set representing an action that a user can perform and defining an indicator that can be awarded for performance of the action, each action data set also being associated with a unique identifier having a corresponding URL;
- a plurality of proximity devices, each proximity device being programmed with the unique identifier and corresponding URL associated with one of the action data sets; and
- a client application that is configured to be executed on a client device capable of reading each of at least some of the proximity devices to obtain the unique identifier and corresponding URL from the proximity device;

wherein, in response to receiving the unique identifier and corresponding URL from a particular proximity device, the client application is configured to send the unique identifier and an identifier of a user to the server system via the URL; and wherein, in response to receiving the unique identifier and identifier of the user from the client application, the server system is configured to employ the unique identifier to locate a corresponding action data set and to employ the identifier of the user to locate and update a corresponding user profile with the indicator defined by the corresponding action data set.

20. The system of claim 19, wherein the corresponding action data set includes criteria that must be met to award the indicator, and wherein the server system evaluates the criteria prior to updating the corresponding user profile with the indicator.

* * * * *